US008756600B2

(12) United States Patent
Mori

(10) Patent No.: US 8,756,600 B2
(45) Date of Patent: Jun. 17, 2014

(54) JUDGING APPARATUS, METHOD, AND RECORDING MEDIUM OF PROGRAM FOR ESTIMATING THE EFFECT OF DEPLOYMENT OF AN APPLICATION IN A VIRTUAL MACHINE ENVIRONMENT

(75) Inventor: Toshitsugu Mori, Kawasaki (JP)

(73) Assignee: Fujitsu Limited, Kawasaki-shi (JP)

( * ) Notice: Subject to any disclaimer, the term of this patent is extended or adjusted under 35 U.S.C. 154(b) by 374 days.

(21) Appl. No.: 13/184,069

(22) Filed: Jul. 15, 2011

(65) Prior Publication Data

US 2012/0023493 A1    Jan. 26, 2012

(30) Foreign Application Priority Data

Jul. 21, 2010  (JP) ................ 2010-164248

(51) Int. Cl.
G06F 9/455 (2006.01)
G06F 9/46 (2006.01)

(52) U.S. Cl.
USPC .............................................. 718/1; 718/104

(58) Field of Classification Search
None
See application file for complete search history.

(56) References Cited

U.S. PATENT DOCUMENTS

| | | | |
|---|---|---|---|
| 7,917,533 B2 | 3/2011 | Nagami et al. | |
| 8,046,765 B2 * | 10/2011 | Cherkasova et al. | 718/104 |
| 8,046,767 B2 * | 10/2011 | Rolia et al. | 718/104 |
| 8,112,756 B2 * | 2/2012 | Cherkasova et al. | 718/104 |
| 8,336,054 B2 * | 12/2012 | Cherkasova et al. | 718/104 |
| 8,433,802 B2 * | 4/2013 | Head et al. | 709/226 |
| 8,434,088 B2 * | 4/2013 | Banerjee et al. | 718/104 |
| 8,543,711 B2 * | 9/2013 | Rolia et al. | 709/229 |
| 2008/0082976 A1 | 4/2008 | Steinwagner et al. | |
| 2008/0104589 A1 * | 5/2008 | McCrory et al. | 718/1 |
| 2009/0259345 A1 * | 10/2009 | Kato et al. | 700/295 |
| 2011/0055479 A1 * | 3/2011 | West et al. | 711/118 |
| 2011/0179132 A1 * | 7/2011 | Mayo et al. | 709/213 |
| 2011/0202925 A1 * | 8/2011 | Banerjee et al. | 718/104 |

FOREIGN PATENT DOCUMENTS

| | | |
|---|---|---|
| JP | 2008-090840 | 4/2008 |
| JP | 2009-259046 | 11/2009 |
| WO | WO2007/148371 | 12/2007 |
| WO | WO2010/050335 | 5/2010 |

OTHER PUBLICATIONS

Office Action issued Feb. 25, 2014, in Japanese Patent Application 2010-164248 filed Jul. 21, 2010 (with English-language translation).

* cited by examiner

Primary Examiner — Van Nguyen
(74) Attorney, Agent, or Firm — Oblon, Spivak, McClelland, Maier & Neustadt, L.L.P.

(57) ABSTRACT

A judging apparatus including an obtaining unit to obtain a first value which indicates a capacity of a resource assigned to a virtual machine of a plurality of virtual machines deployed in a first computer, a first rate which indicates a rate of a resource used by the plurality of virtual machines in the first computer, a second value which indicates a capacity of a resource, assigned to processing of an application, in a second computer, and a second rate which indicates a rate of a resource used by the processing of the application, and a judging unit to judge whether or not a sum of the first rate and the second rate that is corrected based on a ratio between the first value and the second value is over a certain value corresponding to the amount of the resource of the first computer.

7 Claims, 20 Drawing Sheets

FIG. 5A

| TYPE | ITEM | VALUE |
|---|---|---|
| PERFORMANCE | MEMORY USAGE AMOUNT | 2048 MB |
| | DISK SIZE | 120 GB |
| | CPU USAGE RATE | 30% |

FIG. 5B

| TYPE | ITEM | VALUE |
|---|---|---|
| RESOURCE | CPU | 3.0 GHz |
| | DISK SIZE | 175 GB × 5 |
| | MEMORY SIZE | 8.0 GB |

FIG. 6

| TYPE | ITEM | VALUE |
|---|---|---|
| RESOURCE | CPU | 3.0 GHz |
| | DISK SIZE | 249 GB |
| | MEMORY SIZE | 4.0 GB |
| PERFORMANCE | MEMORY USAGE AMOUNT | 1024 MB |
| | DISK SIZE | 42 GB |
| | CPU USAGE RATE | 5 % |
| | DISK BUSY RATE | 2 % |

FIG. 7

| TYPE | ITEM | VALUE |
|---|---|---|
| RESOURCE | CPU | 3.0 GHz × 2 |
| | DISK SIZE | 175 GB × 5 |
| | MEMORY SIZE | 8.0 GB |
| PERFORMANCE | MEMORY USAGE AMOUNT | 3024 MB |
| | DISK SIZE | 90 GB |
| | CPU USAGE RATE | 26 % |
| | DISK BUSY RATE | 5 % |

FIG. 8

| TYPE | ITEM | VALUE |
|---|---|---|
| RESOURCE | MEMORY SIZE | 2048 MB |
| | DISK SIZE | 120 GB |
| | NUMBER OF CPU CLOCKS | 3.0 GHz |
| PERFORMANCE | MEMORY USAGE AMOUNT | 1248 MB |
| | DISK SIZE | 60 GB |
| | CPU USAGE RATE | 50 % |
| | DISK BUSY RATE | 2 % |

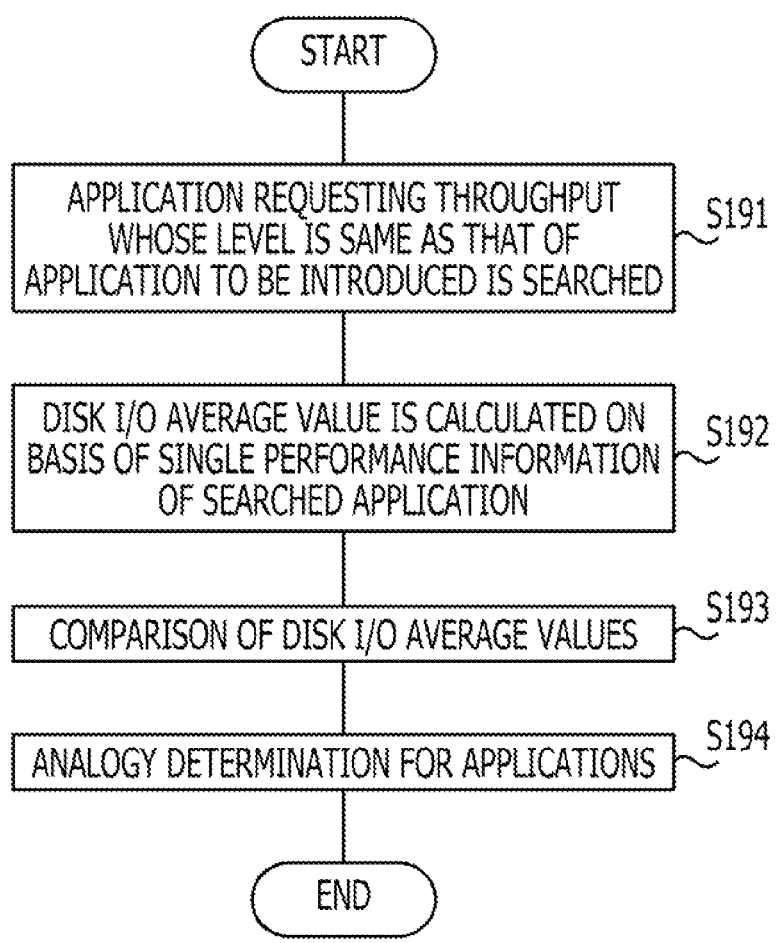

FIG. 11A

| TYPE | ITEM | VALUE |
|---|---|---|
| RESOURCE | CPU | 3.0 GHz × 2 |
| | DISK SIZE | 175 GB × 5 |
| | MEMORY SIZE | 8.0 GB |
| PERFORMANCE | MEMORY USAGE AMOUNT | 3024 MB |
| | DISK SIZE | 90 GB |
| | CPU USAGE RATE | 26 % |
| | DISK BUSY RATE | 5 % |

FIG. 11B

| TYPE | ITEM | VALUE |
|---|---|---|
| RESOURCE | CPU | 3.0 GHz |
| | DISK SIZE | 249 GB |
| | MEMORY SIZE | 4.0 GB |
| PERFORMANCE | MEMORY USAGE AMOUNT | 2048 MB |
| | DISK SIZE | 95 GB |
| | CPU USAGE RATE | 40 % |
| | DISK BUSY RATE | 2 % |

FIG. 14

| TYPE | ITEM | VALU |
|---|---|---|
| DAILY | PEAK TIMING | 17 : 00 |
| | MEMORY USAGE AMOUNT | 3024 MB |
| | CPU USAGE RATE | 80 % |
| | DISK BUSY RATE | 68 % |
| MONTHLY | PEAK TIMING | 20th |
| | MEMORY USAGE AMOUNT | 2864 MB |
| | CPU USAGE RATE | 37 % |
| | DISK BUSY RATE | 40 % |
| QUARTERLY | PEAK TIMING | THIRD MONTH |
| | MEMORY USAGE AMOUNT | 2634 MB |
| | CPU USAGE RATE | 35 % |
| | DISK BUSY RATE | 24 % |
| YEARLY | PEAK TIMING | DECEMBER |
| | MEMORY USAGE AMOUNT | 2768 MB |
| | CPU USAGE RATE | 45 % |
| | DISK BUSY RATE | 28 % |

FIG. 15

| TYPE | ITEM | VALU |
|---|---|---|
| DAILY | PEAK TIMING | 17 : 00 |
| | MEMORY USAGE AMOUNT | 3012 MB |
| | CPU USAGE RATE | 74 % |
| | DISK BUSY RATE | 60 % |
| MONTHLY | PEAK TIMING | 25th |
| | MEMORY USAGE AMOUNT | 2900 MB |
| | CPU USAGE RATE | 26 % |
| | DISK BUSY RATE | 40 % |
| QUARTERLY | PEAK TIMING | FOURTH MONTH |
| | MEMORY USAGE AMOUNT | 2634 MB |
| | CPU USAGE RATE | 35 % |
| | DISK BUSY RATE | 24 % |
| YEARLY | PEAK TIMING | MARCH |
| | MEMORY USAGE AMOUNT | 2432 MB |
| | CPU USAGE RATE | 39 % |
| | DISK BUSY RATE | 45 % |

FIG. 20

| TYPE | ITEM | PREDICTION VALUE ||
|---|---|---|---|
| SINGLE PERFORMANCE PREDICTION VALUE | | PREDICTION ITEM | VALUE |
| | CPU USAGE RATE | | 40 % |
| | MEMORY USAGE AMOUNT | | 3072 MB |
| | DISK BUSY RATE | | 5 % |
| UNIT TIME PERIOD PERFORMANCE PREDICTION | DAILY | PEAK TIMING | 17 : 00 |
| | | MEMORY USAGE AMOUNT | 3024 MB |
| | | CPU USAGE RATE | 80 % |
| | | DISK BUSY RATE | 68 % |
| | MONTHLY | PEAK TIMING | 20th |
| | | MEMORY USAGE AMOUNT | 2864 MB |
| | | CPU USAGE RATE | 37 % |
| | | DISK BUSY RATE | 40 % |
| | QUARTERLY | PEAK TIMING | FOURTH MONTH |
| | | MEMORY USAGE AMOUNT | 2634 MB |
| | | CPU USAGE RATE | 35 % |
| | | DISK BUSY RATE | 24 % |
| | YEARLY | PEAK TIMING | DECEMBER |
| | | MEMORY USAGE AMOUNT | 2768 MB |
| | | CPU USAGE RATE | 45 % |
| | | DISK BUSY RATE | 28 % |
| INFLUENCE ON ANOTHER APPLICATION | APPLICATION NAME | | |
| | APPLICATION A | DAILY | PEAK TIMING | 17 : 00 |
| | | | CPU USAGE RATE | 75 % |
| | | | MEMORY USAGE AMOUNT | |
| | | | DISK BUSY RATE | |
| | | MONTHLY | NOT AVAILABLE | |
| | | QUARTERLY | NOT AVAILABLE | |
| | | YEARLY | NOT AVAILABLE | |

JUDGING APPARATUS, METHOD, AND RECORDING MEDIUM OF PROGRAM FOR ESTIMATING THE EFFECT OF DEPLOYMENT OF AN APPLICATION IN A VIRTUAL MACHINE ENVIRONMENT

CROSS-REFERENCE TO RELATED APPLICATIONS

This application is based upon and claims the benefit of priority of the prior Japanese Patent Application No. 2010-164248, filed on Jul. 21, 2010, the entire contents of which are incorporated herein by reference.

FIELD

The embodiments disclosed herein are related to a judging apparatus and related method and recording medium.

BACKGROUND

In recent years, among data centers, large-scale IT systems, and the like, the utilization of virtual machines that execute applications deployed in individual virtual machines has spread.

With respect to the deployment of applications, for example, in Japanese Unexamined Patent Application Publication No. 2008-090840, a technique relating to a method for utilization of a virtual machine used for simplifying the deployment or the setting of applications is disclosed. In addition, in Japanese Unexamined Patent Application Publication No. 2009-259046, a technique is disclosed that efficiently manages a master to be a target to which an application for each user is deployed, in a case in which a thin client service is mainly provided.

SUMMARY

According to an aspect of the invention, an judging apparatus including an obtaining unit to obtain a first value which indicates a capacity of a resource assigned to a virtual machine of a plurality of virtual machines deployed in a first computer, a first rate which indicates a rate of a resource used by the plurality of virtual machines in the first computer, a second value which indicates a capacity of a resource, assigned to processing of an application, in a second computer, and a second rate which indicates a rate of a resource used by the processing of the application, and a judging unit to judge whether or not a sum of the first rate and the second rate that is corrected based on a ratio between the first value and the second value is over a certain value corresponding to the amount of the resource of the first computer.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B illustrate examples of a baseline value of an application and machine information at the time of measurement of the baseline value;

FIG. 6 illustrates an example of information of a virtual machine that is an introduction destination of an application;

FIG. 7 illustrates an example of information of a physical machine in which an introduction destination virtual machine exists;

FIG. 8 illustrates an example of information of a co-existing virtual machine;

FIG. 10 illustrates a flowchart illustrating an example of a search procedure for a similar application;

FIG. 11A illustrates an example of information of a physical machine into which a same application is introduced;

FIG. 11B illustrates an example of information of a virtual machine into which a same application is introduced;

FIG. 14 individually illustrates examples of the detection of load peaks of a same application and an application on a co-existing virtual machine;

FIG. 15 individually illustrates examples of the detection of load peaks of a same application and an application on a co-existing virtual machine;

FIG. 20 illustrates an example of a verification result.

DESCRIPTION OF EMBODIMENTS

When a plurality of virtual machines operate on a same physical machine, it is beneficial and/or necessary to consider the influences of virtual machines existing on the same physical machine. In some case, there occurs a problem that assumed performance is not acquired after the operation thereof is started, owing to the influence of another virtual machine existing on the same physical machine.

Hereinafter, the present invention will be specifically described on the basis of figures illustrating an embodiment thereof.

Figure 1:
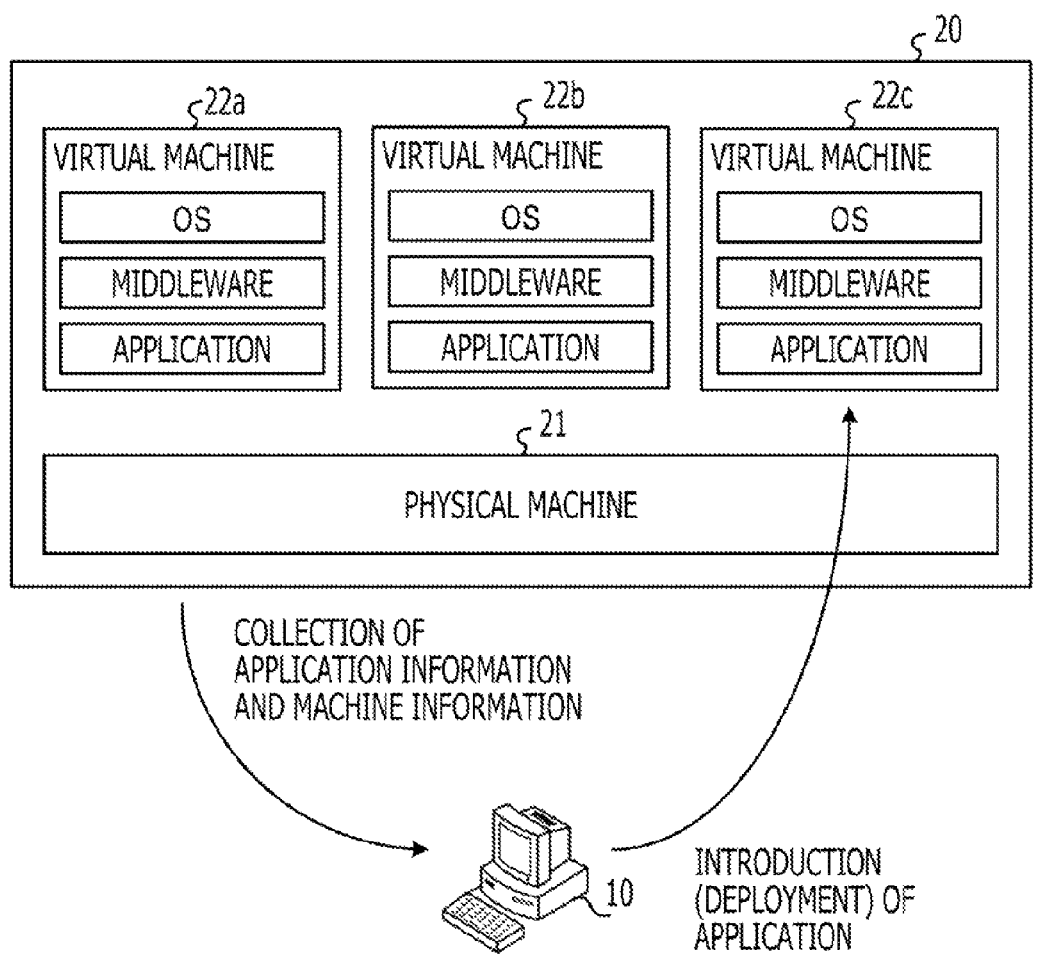
FIG. 1 illustrates a whole configuration of a system according to the present embodiment.

FIG. 1 is a pattern diagram illustrating the configuration of a system according to the present embodiment. The system illustrated in FIG. 1 includes a verification apparatus 10 that verifies an operation at the deployment destination of an application and an information processing apparatus 20 that is the deployment target of the application.

For example, the information processing apparatus 20 is a personal computer, a server apparatus, or the like, and in the present embodiment, is to be the introduction target of the application. The information processing apparatus 20 exemplified in FIG. 1 includes one physical machine 21 and three virtual machines 22a to 22c. The physical machine 21 includes hardware including a CPU, a memory, and a hard disk and a hypervisor used for realizing the virtual machines 22a to 22c in the information processing apparatus 20. For example, the virtual machines 22a and 22b are operating virtual machines into which an operating system (OS), middleware, and an application have been introduced, and the virtual machine 22c is a virtual machine into which an application is to be newly introduced.

In addition, while, in the example illustrated in FIG. 1, a configuration is adopted in which the three virtual machines 22a to 22c are provided for the one physical machine 21, the number of physical machines and virtual machines is not limited to the above-mentioned example, and the administrator of the present system or the user of the information processing apparatus 20 can arbitrarily set the number.

Here, the applications introduced into the virtual machines 22a to 22c refer to integrated application software or the like in which a single piece of application software and a plurality of programs operate in cooperation with one another. The applications may also include various kinds of settings or data used in the application software.

The introduction (deployment) of an application is not necessarily performed using the verification apparatus 10. In addition, a configuration may also be adopted in which the deployment of an application is performed by the administrator using a portable recording medium such as a CD-ROM, a DVD-ROM, a USB memory, or the like, or a configuration may also be adopted in which the deployment of an application is performed from an external server through a communication line such as Internet or the like.

The verification apparatus 10 is a personal computer, a server apparatus, or the like. In addition, when an application is newly introduced into the information processing apparatus 20, the verification apparatus 10 verifies whether or not the application is suitable for introduction, by performing operation verification for the application or operation verification for the physical machine 21 and the virtual machines 22a to 22c in the case of the introduction of the application.

Figure 2:
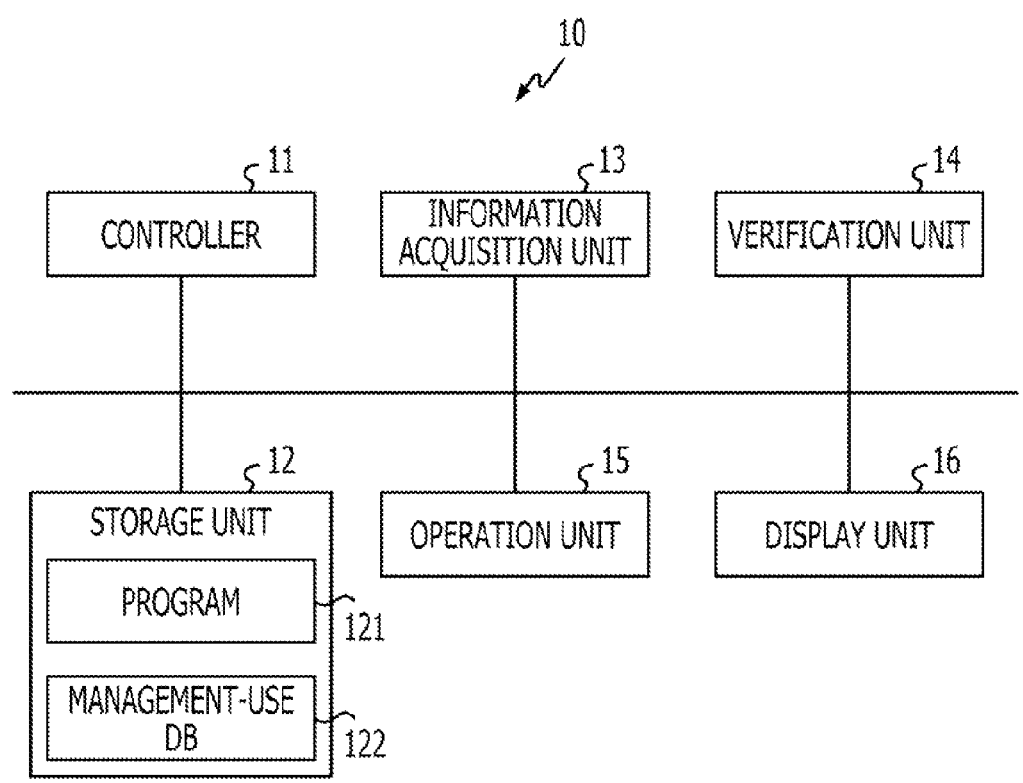
FIG. 2 illustrates an internal configuration of a verification apparatus.

FIG. 2 is a block diagram explaining the internal configuration of the verification apparatus 10. The verification apparatus 10 includes a controller 11, a storage unit 12, an information acquisition unit 13, a verification unit 14, an operation unit 15, and a display unit 16.

For example, the controller 11 includes a processor, such as a micro processing unit (MPU), a read only memory (ROM), and a random access memory (RAM). The storage unit 12 is memory means such as a hard disk drive (HDD), a flash memory, or the like, and stores therein a program 121 according to the present application. In addition, the storage unit 12 includes a management-use database (management-use DB) 122 used for storing the information of an application that is an introduction target, the information of the physical machine 21 that is an introduction destination, the information of the virtual machines 22a to 22c included in the physical machine that is an introduction destination, and the like.

By reading in and executing the program 121 according to the present application from the storage unit 12, the controller 11 controls the operations of the above-described individual portions of the hardware, and causes the individual portions of the hardware to function as a verification apparatus according to the present application.

The information acquisition unit 13 acquires information for verification from the outside of the verification apparatus 10. For example, the information acquisition unit 13 is an interface used for acquiring the baseline value of an application scheduled for introduction, machine information at the time of the extraction of the baseline value, the information of a virtual machine that is an introduction destination, the information of a physical machine that is an introduction destination, the information of a co-existing virtual machine, the information of a same application, information relating to the usage situation of a resource (computer resource) per unit time period (a load on the virtual machine), and the like. The detail of each of the pieces of information will be described later.

On the basis of the information acquired in the information acquisition unit 13, the verification unit 14 performs operation verification for an application or operation verification for the physical machine 21 and the virtual machines 22a to 22c in the case of the introduction of the application, and verifies whether or not the application is suitable for introduction. In addition, the controller 11, the information acquisition unit, and the verification unit 14 may be configured by one processor (processing apparatus). At that time, the processor may include a main memory.

The operation unit 15 is an input device such as a keyboard, a mouse, or the like used for receiving an operation instruction from the administrator. The display unit 16 is a display device such as a liquid crystal display or the like used for displaying information of which the administrator is to be notified, information acquired in the information acquisition unit 13, a verification result obtained in the verification unit 14, and the like.

Figure 3:
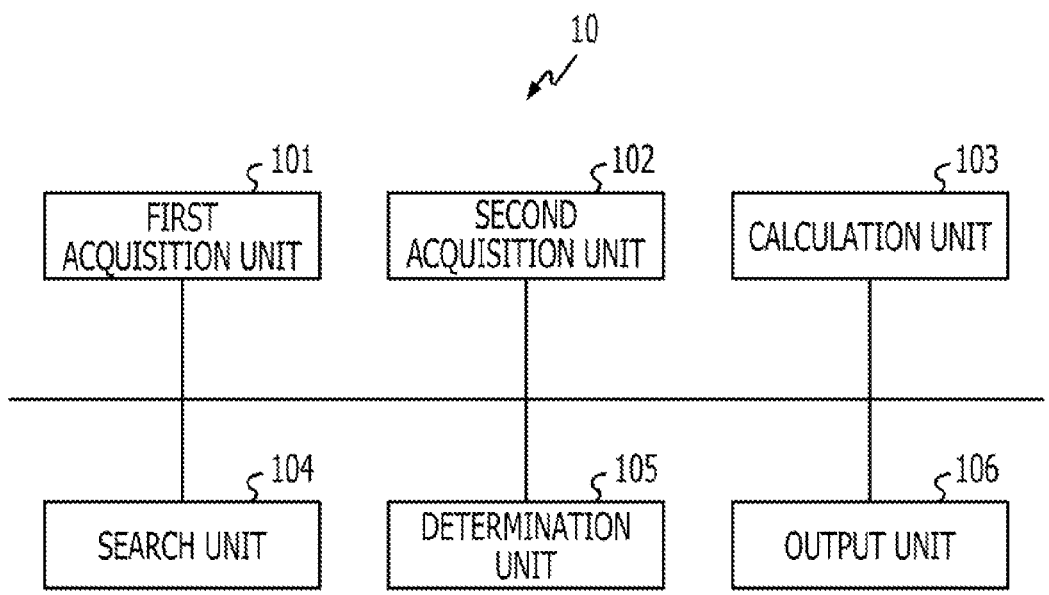
FIG. 3 illustrates a functional configuration of a verification apparatus.

FIG. 3 is a block diagram explaining the functional configuration of the verification apparatus 10. The verification apparatus 10 includes a first acquisition unit 101, a second acquisition unit 102, a calculation unit 103, a search unit 104, a determination unit 105, and an output unit 106.

For example, the first acquisition unit 101 acquires information relating to a load per unit time period on a virtual machine. In addition, the second acquisition unit 102 acquires information relating to an application to be introduced into the virtual machine. The functions of the first acquisition unit 101 and the second acquisition unit 102 are functions included in the information acquisition unit 13 illustrated in FIG. 2.

The calculation unit 103 calculates a prediction value of a load on a virtual machine at the time of the introduction of the application to the corresponding virtual machine. The search unit 104 searches another virtual machine into which the same or a similar application as the above-mentioned application is introduced. The functions of the calculation unit 103 and the search unit 104 are example functions included in the controller 11 illustrated in FIG. 2.

On the basis of a comparison result obtained by comparing the information acquired in the first acquisition unit 101 with the prediction value calculate by the calculation unit 103, the determination unit 105 may determine whether or not the application is suitable for introduction. The function of the determination unit 105 is a function included in the verification unit 14 illustrated in FIG. 2, for example.

The output unit 106 outputs information such as the comparison result, obtained by comparing the information acquired in the first acquisition unit 101 with the prediction value calculated by the calculation unit 103, or the like. The function of the output unit 106 is a function included in the display unit 16 illustrated in FIG. 2, for example. In addition, a configuration may also be adopted in which communication interface is provided in the verification apparatus 10 and information such as the above-mentioned comparison result or the like is transmitted to the outside of the verification apparatus 10 using the communication interface.

Figure 4:
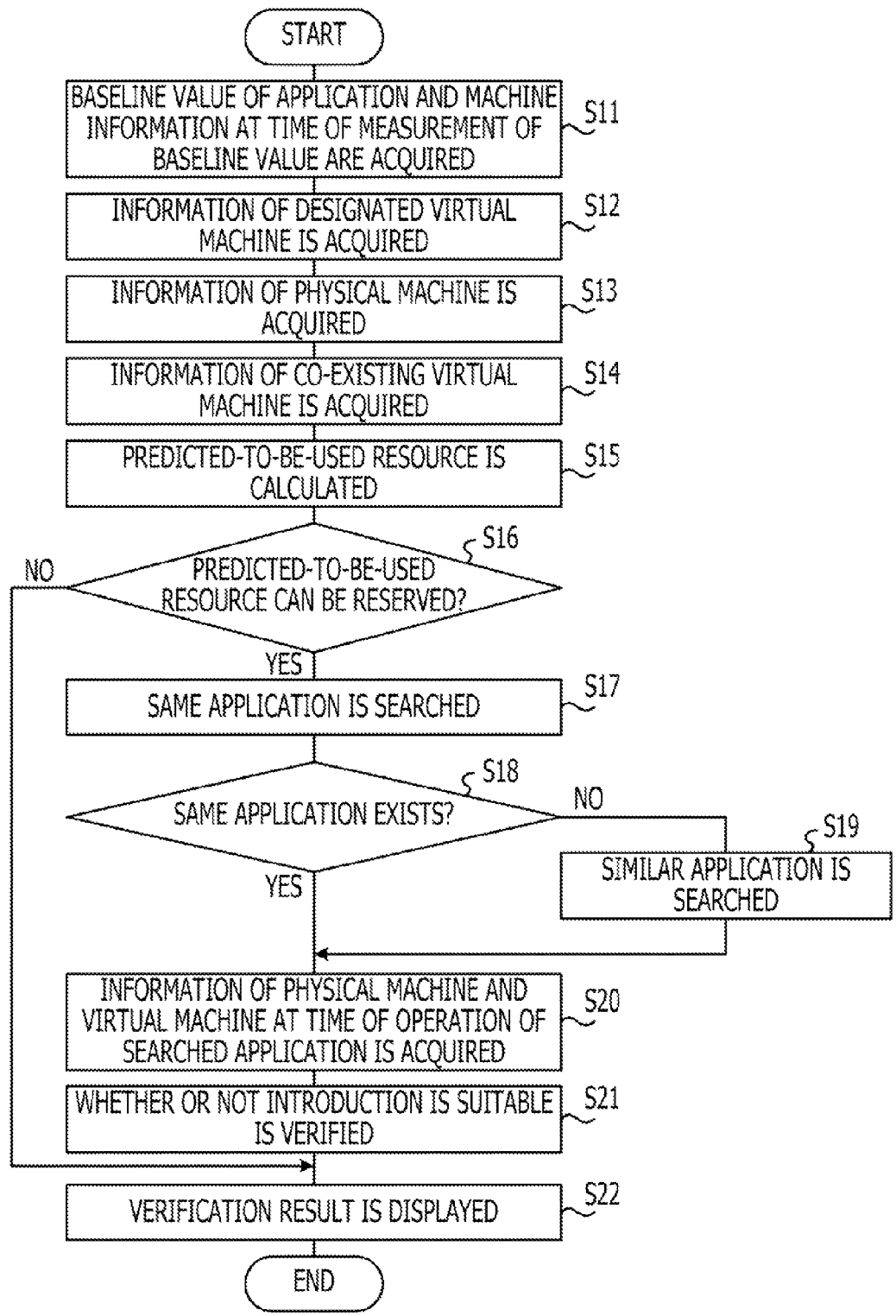
FIG. 4 illustrates a flowchart for explaining a procedure of processing executed by a verification apparatus.

Hereinafter, processing executed by the verification apparatus 10 will be described. FIG. 4 is a flowchart for explaining the procedure of the processing executed by the verification apparatus 10. Through the information acquisition unit 13, the verification apparatus 10 acquires the baseline value of an application to be introduced and machine information at the time of measurement of the baseline value (S11). Here, the baseline value of the application indicates the usage situation of a resource at the time of the operation of the application on an arbitrary machine, and indicates information such as a memory usage amount, a disk size, a CPU usage rate, and the like. As a machine causing the application to operate or a machine used for measuring the baseline value of the application, an arbitrary machine may be used. The verification apparatus 10 may calculate the baseline value, or the baseline value may be calculated using another computer or server apparatus. In S11, not only is the baseline value of the application acquired, but the information (e.g., the information of a CPU, a disk size, and a memory size) of the machine causing the application to operate is also acquired. FIGS. 5A and 5B illustrate examples of the baseline value of the application and the machine information at the time of measurement of the baseline value.

Next, through the information acquisition unit 13, the verification apparatus 10 acquires the information of a virtual machine designated as an introduction destination and the information of a physical machine in which the virtual machine designated as an introduction destination exists (S12, S13). In the example illustrated in FIG. 1, since the virtual machine 22c is designated as the introduction destination of the application, the information of the virtual machine 22c is acquired in S12, and the information of the physical machine 21 is acquired in S13. FIG. 6 is a diagram illustrating an example of the information of the virtual machine that is the introduction destination of the application, and FIG. 7 is a diagram illustrating an example of the information of the physical machine in which the introduction destination virtual machine exists. The acquired information of the virtual machine includes the information of a computer resource (resource) and performance data at operating time. Here, the value of the resource of the virtual machine is the value of a resource assigned at the time of the creation of the virtual machine, and includes the number of clocks of a CPU, a disk size, a memory size, and the like. The performance data indicates the usage situation of the resource during the operation of the virtual machine, and includes a memory usage amount, a disk size, a CPU usage rate, a disk busy rate, and the like.

On the other hand, the value of the resource of the physical machine is a value specified by hardware included in the information processing apparatus 20, and includes the number of clocks of a CPU, a disk size, a memory size, and the like, in the same way as the value of the resource of the virtual machine. The performance data of the physical machine indicates the usage situation of the resource during the operation of the physical machine, and includes a memory usage amount, a disk size, a CPU usage rate, a disk busy rate, and the like.

Next, through the information acquisition unit 13, the verification apparatus 10 acquires the information of a virtual machine co-existing with the virtual machine designated as an introduction destination (S14). In the example illustrated in FIG. 1, since the virtual machine 22c is designated as the introduction destination of the application, the information of the virtual machines 22a and 22b co-existing in the information processing apparatus 20 is acquired in S14. FIG. 8 is a diagram illustrating an example of the information of the co-existing virtual machine. The acquired information of the virtual machine includes the information of a computer resource (resource) and performance data at operating time. Here, the value of the resource of the virtual machine is the value of a resource assigned at the time of the creation of the virtual machine, and includes the number of clocks of a CPU, a disk size, a memory size, and the like. The performance data indicates the usage situation of the resource during the operation of the virtual machine, and includes a memory usage amount, a disk size, a CPU usage rate, a disk busy rate, and the like. In addition, while, in FIG. 8, the virtual machine information corresponding to one virtual machine is illustrated, a plurality of pieces of virtual machine information are acquired when a plurality of co-existing virtual machines exist. Here, the co-existing virtual machine refers to a virtual machine other than the virtual machine designated as the introduction destination of the application within the information processing apparatus 20.

Figure 9:
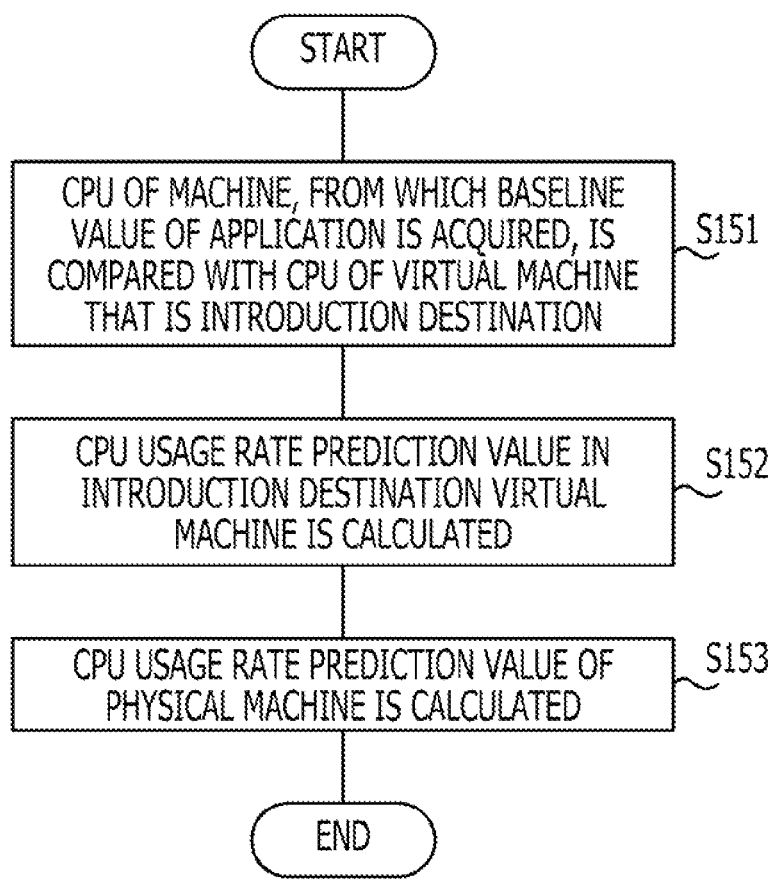
FIG. 9 illustrates a flowchart illustrating an example of a calculation procedure for a predicted-to-be-used resource.

Next, the verification unit 14 in the verification apparatus 10 calculates the predicted-to-be-used resource of the application scheduled for introduction (S15). FIG. 9 is a flowchart illustrating an example of a calculation procedure for the predicted-to-be-used resource. Since the baseline value of the application scheduled for introduction and the machine information at the time of measurement of the baseline value are acquired in S11, and the information of the virtual machine designated as the introduction destination and the information of the physical machine are acquired in S12 and S13, the verification unit 14 compares the CPU of the machine, from which the baseline value of the application is acquired, with the CPU of the virtual machine that is the introduction destination (S151), and calculates a ratio between the two. In addition, using the calculated ratio, the verification unit 14 calculates a CPU usage rate prediction value in the introduction destination virtual machine (S152), and calculates the usage rate prediction value of the physical machine (S153).

After the predicted-to-be-used resource is calculated in S15, the verification unit 14 determines whether or not the predicted-to-be-used resource can be reserved in the virtual machine and the physical machine (S16). Namely, the verification unit 14 compares the calculated value of the predicted-to-be-used resource with the information of the virtual machine and the physical machine, acquired in S12 and S13, and the verification unit 14 determines whether or not the predicted-to-be-used resource can be reserved.

When it is difficult to reserve the predicted-to-be-used resource (S16: NO), the verification unit 14 causes the display unit 16 to display a verification result (S22). Here, since it is difficult to reserve the resource, a verification result indicating that it is difficult to introduce the application is displayed.

When it is determined that the predicted-to-be-used resource can be reserved (S16: YES), the verification unit 14 searches the same application that has been already introduced into another virtual machine and has operated (S17), and determines whether or not the same application exists (S18). When it is determined that the same application does not exist (S18: NO), the verification unit 14 searches a similar application (S19). In addition, a configuration may also be adopted in which a notice indicating that it is difficult to verify whether or not the application is suitable for introduction is sent, or the administrator of the present system or the user of the information processing apparatus 20 is caused to arbitrarily select an application, when the similar application is not found in S19.

FIG. 10 is a flowchart illustrating an example of a search procedure for the similar application. First, the verification unit 14 searches, from the information processing apparatus 20, an application requesting throughput whose level is the same as that of the application to be introduced (S191), and calculates a disk I/O average value on the basis of the single performance information of the searched application (namely, the application requesting throughput whose level is the same as that of the application to be introduced) (S192).

In addition, the verification unit 14 compares the disk I/O average value of the searched application with the disk I/O average value of the application to be an introduction target (S193), and performs analogy determination for the applications (S194). For example, when a difference between the disk I/O average values of the two applications is within 5%, it is determined that the searched application is the similar application, and when the difference between the disk I/O average values of the two applications is greater than 5%, it is determined that the searched application is a dissimilar application.

When, in S18, it is determined that the same application exists (S18: YES) or after the search of the similar application in S19 is performed, the verification unit 14 acquires the information of the physical machine and the virtual machine at the time of the operation of the searched application (S20). FIG. 11A is a diagram illustrating an example of the information of a physical machine into which the same application is introduced, and FIG. 11B is a diagram illustrating an example of the information of a virtual machine into which the same application is introduced. In the present embodiment, since a configuration is adopted in which the same application is searched from a virtual machine co-existing with the virtual machine that is an introduction destination, and the physical machine is a common machine, the information of the resource and the performance data of the physical machine are just the same as the information of the physical machine illustrated in FIG. 7. On the other hand, with respect to the information of the virtual machine, the information of the resource and the performance data, measured with respect to the virtual machine into which the searched application is introduced, are acquired.

In addition, while, in FIGS. 11A and 11B, the information of the physical machine and the virtual machine into which the same application is introduced is illustrated, the information of the physical machine and the virtual machine into which the similar application is introduced is acquired in S20 in the same way as the same application, when the searched application is the similar application.

After the information of the physical machine and the virtual machine at the time of the operation of the application searched in S20 is acquired, the verification unit 14 verifies whether or not the application is suitable for introduction (S21), and causes the display unit 16 to display a verification result (S22).

Figure 12:
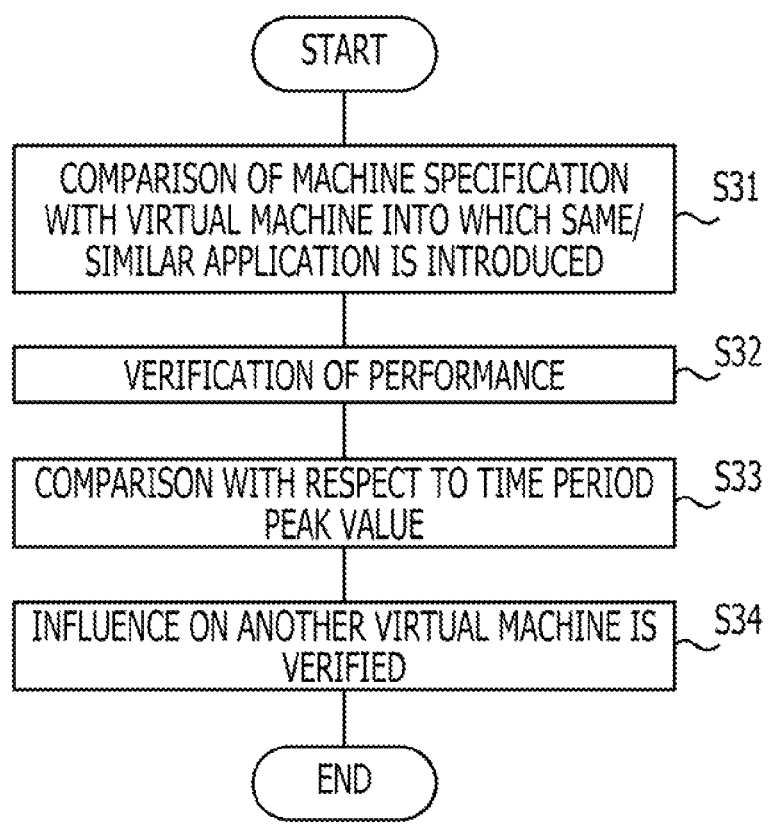
FIG. 12 illustrates a flowchart illustrating an example of a procedure for verifying whether or not an application is suitable for introduction.

Hereinafter, a procedure for verifying whether or not the application is suitable for introduction, performed in S21, will be described. FIG. 12 is a flowchart illustrating an example of the procedure for verifying whether or not the application is suitable for introduction. The verification unit 14 compares the machine specification of the virtual machine that is an introduction destination with the machine specification of the virtual machine into which the same or similar application is introduced (S31), and verifies whether or not the performance of the same or similar application is ensured in the virtual machine that is an introduction destination (S32).

Next, the verification unit 14 performs comparison with respect to a time period peak value (S33). While a detailed procedure will be described later, here, performance is checked with respect to each certain time period (for example, daily, monthly, quarterly, or yearly), a time period during which a maximum load on the resource occurs is obtained, and comparison with the performance during the time period is performed.

Next, the verification unit 14 verifies an influence on another virtual machine (S34). While a detailed procedure will be described later, an influence on another virtual machine when the application is actually introduced into the virtual machine is verified, here.

Figure 13:
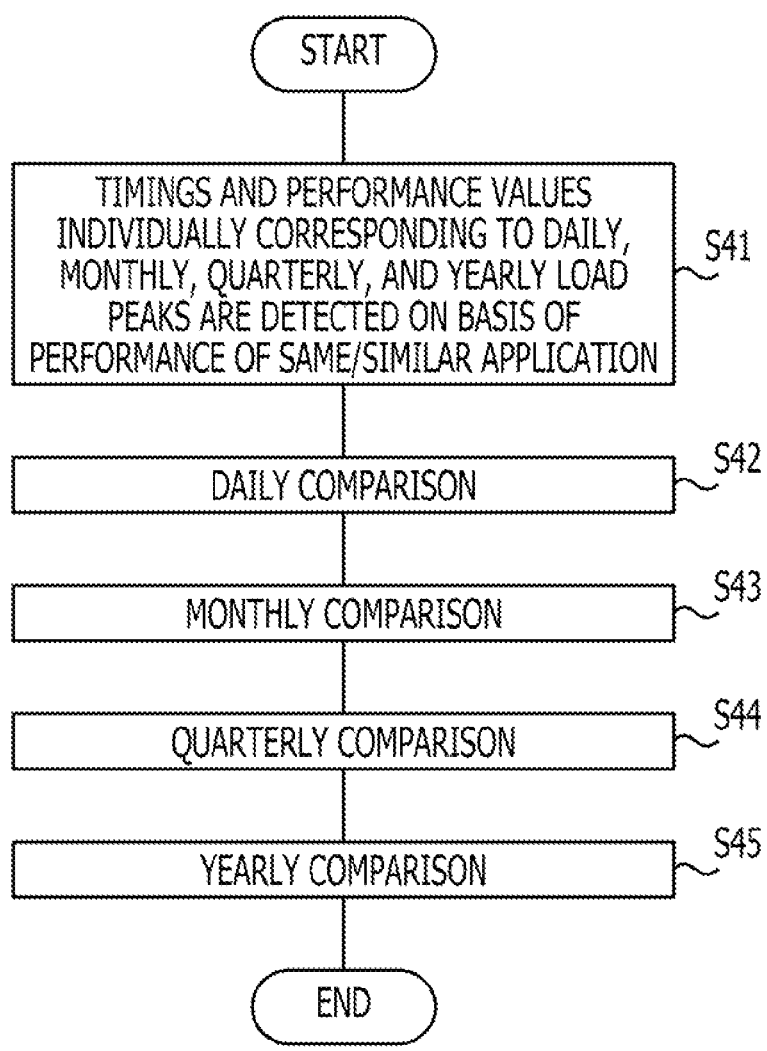
FIG. 13 illustrates a flowchart illustrating an example of a comparison procedure with respect to a time period peak value.

FIG. 13 is a flowchart illustrating an example of the comparison procedure with respect to the time period peak value. First, on the basis of the performance of the same or similar application, the verification unit 14 detects timings and performance values, which individually correspond to daily, monthly, quarterly, and yearly load peaks (S41). FIG. 14 and FIG. 15 are diagrams individually illustrating examples of the detection of load peaks of a same application and an application on a co-existing virtual machine.

Next, performance at timings corresponding to daily, monthly, quarterly, and yearly load peaks acquired in S41 is compared with performance in an introduction destination virtual machine (S42 to S45).

Figure 16:
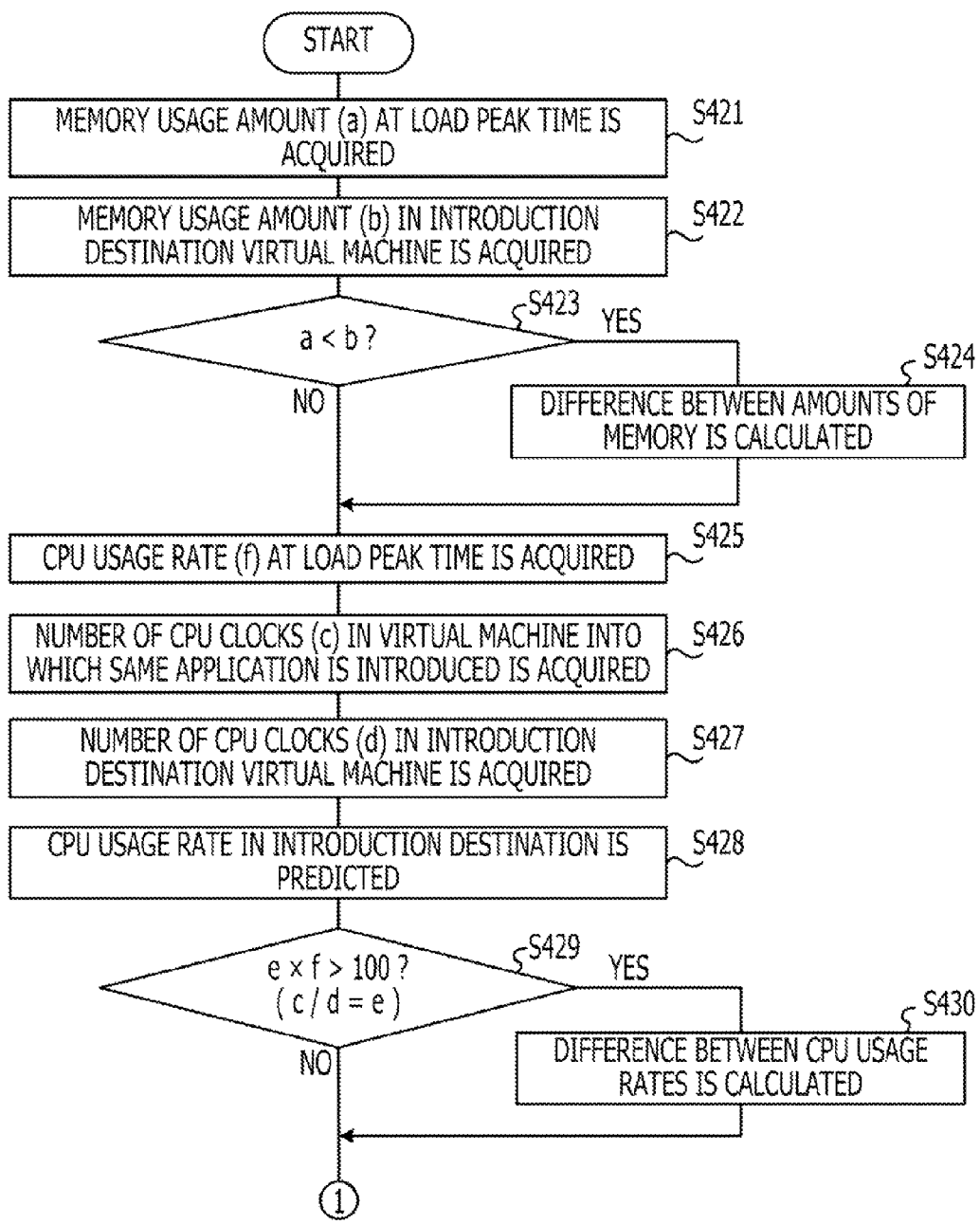
FIG. 16 illustrates a flowchart illustrating an example of a procedure for comparing performance at a load peak timing with performance in an introduction destination virtual machine.
Figure 17:
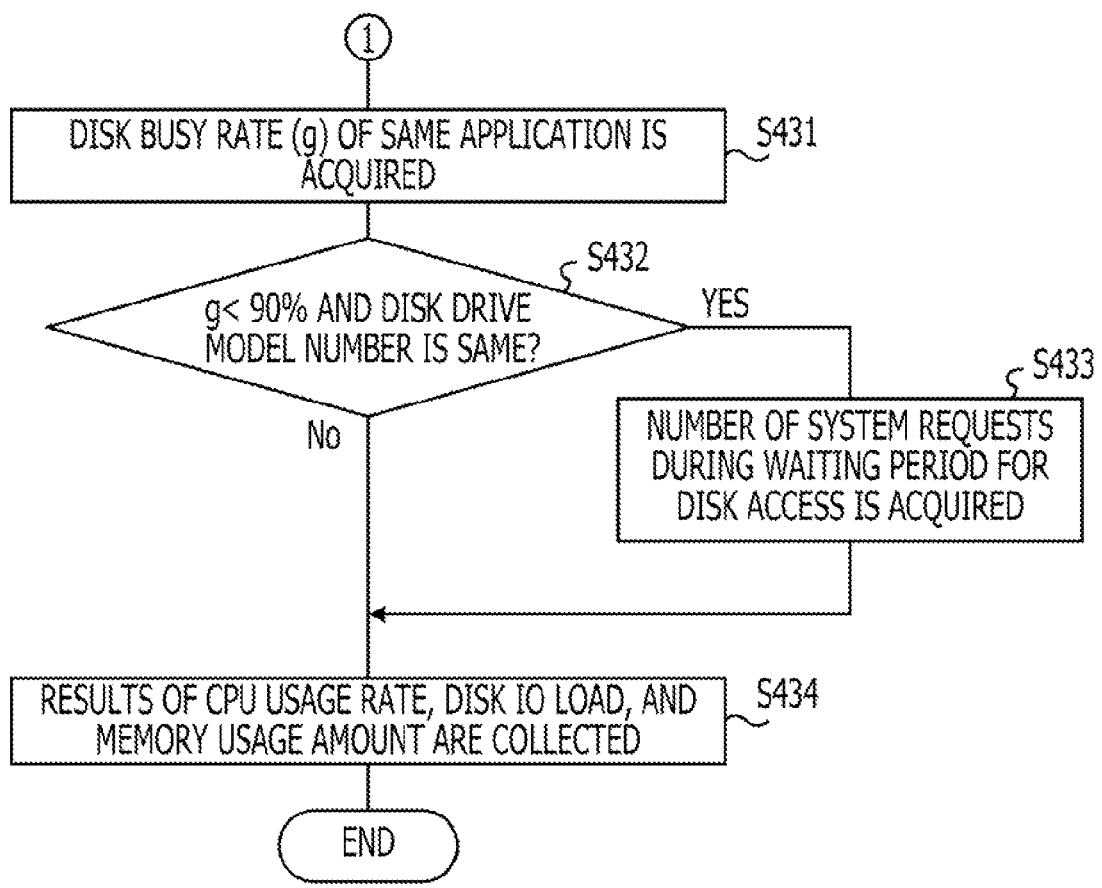
FIG. 17 illustrates a flowchart illustrating an example of a procedure for comparing performance at a load peak timing with performance in an introduction destination virtual machine.

As an example, a procedure for comparing the performance at the timing corresponding to a daily load peak with the performance in the introduction destination virtual machine will be described. FIG. 16 and FIG. 17 are flowcharts illustrating an example of the procedure for comparing performance at a load peak timing with performance in the introduction destination virtual machine. First, the verification unit 14 acquires a memory usage amount (defined as "a") at a load peak time, and acquires a memory usage amount (defined as "b") in the introduction destination virtual machine (S421 and S422).

Next, the verification unit 14 determines a magnitude relation between the memory usage amount at the load peak time and the memory usage amount in the introduction destination virtual machine (S423), and when the memory usage amount in the introduction destination virtual machine is greater (S423: YES), the verification unit 14 calculates a difference between the amounts of memory (S424). The calculated difference between the amounts of memory is stored as a verification result.

When the memory usage amount in the introduction destination virtual machine is smaller (S423: NO) or when the difference between the amounts of memory is calculated in S424 (S424), the verification unit 14 acquires a CPU usage rate (defined as "f") at the load peak time, and acquires the number of CPU clocks (defined as "c") in the virtual machine into which the same application is introduced, and the number of CPU clocks (defined as "d") in the introduction destination virtual machine (S425 to S427).

Next, by multiplying a value (defined as "e") by the CPU usage rate (f) at the load peak time, the value (e) being obtained by dividing the number of CPU clocks (c) in the virtual machine into which the same application is introduced by the number of CPU clocks (d) in the introduction destination virtual machine, the verification unit 14 calculates the prediction value of a CPU usage rate in the introduction destination (S428). The verification unit 14 determines whether or not the calculated prediction value exceeds 100

(S429), and when the prediction value (e×f) of the CPU usage rate in the introduction destination exceeds 100 (S429: YES), the verification unit 14 calculates a difference between the CPU usage rates (S430). The calculated difference between the CPU usage rates is stored as a verification result.

When the prediction value (e×f) of the CPU usage rate in the introduction destination does not exceed 100 (S429: NO) or when the difference between the CPU usage rates is calculated in S430 (S430), the verification unit 14 acquires the disk busy rate (defined as "g") of the same application (S431).

Next, the verification unit 14 determines whether or not the disk busy rate g of the same application is less than 90% and a disk drive model number is the same (S432). When the disk busy rate g of the same application is less than 90% and the disk drive model number is the same (S432: YES), the verification unit 14 acquires the number of system requests during a waiting period for disk access (S433).

When, in S432, it is determined that the disk busy rate g of the same application is greater than or equal to 90% or the disk drive model number is not the same (S432: NO) or when the number of system requests is acquired in S433 (S433), the verification unit 14 collects and stores the result of each of the CPU usage rate, a disk IO load, and the memory usage amount (S434), for example.

In addition, while, in the flowcharts illustrated in FIG. 16 and FIG. 17, the procedure for comparing the performance at the timing corresponding to the daily load peak with the performance in the introduction destination virtual machine has been described, the comparison of performance may also be performed in the same procedure with respect to the monthly, quarterly, and yearly load peak timings.

Figure 18:
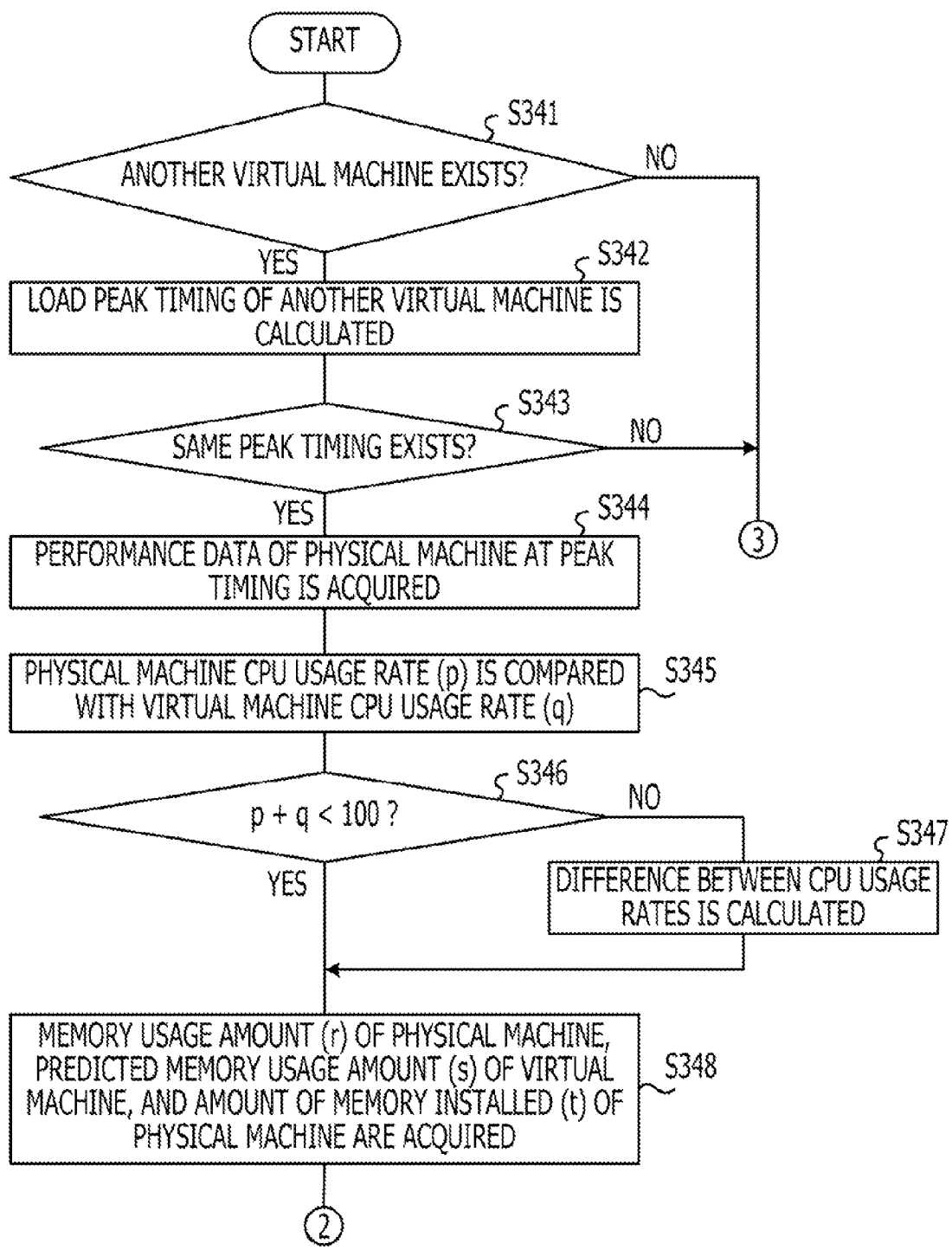
FIG. 18 illustrates a flowchart illustrating an example of a procedure for verifying an influence on another virtual machine.
Figure 19:
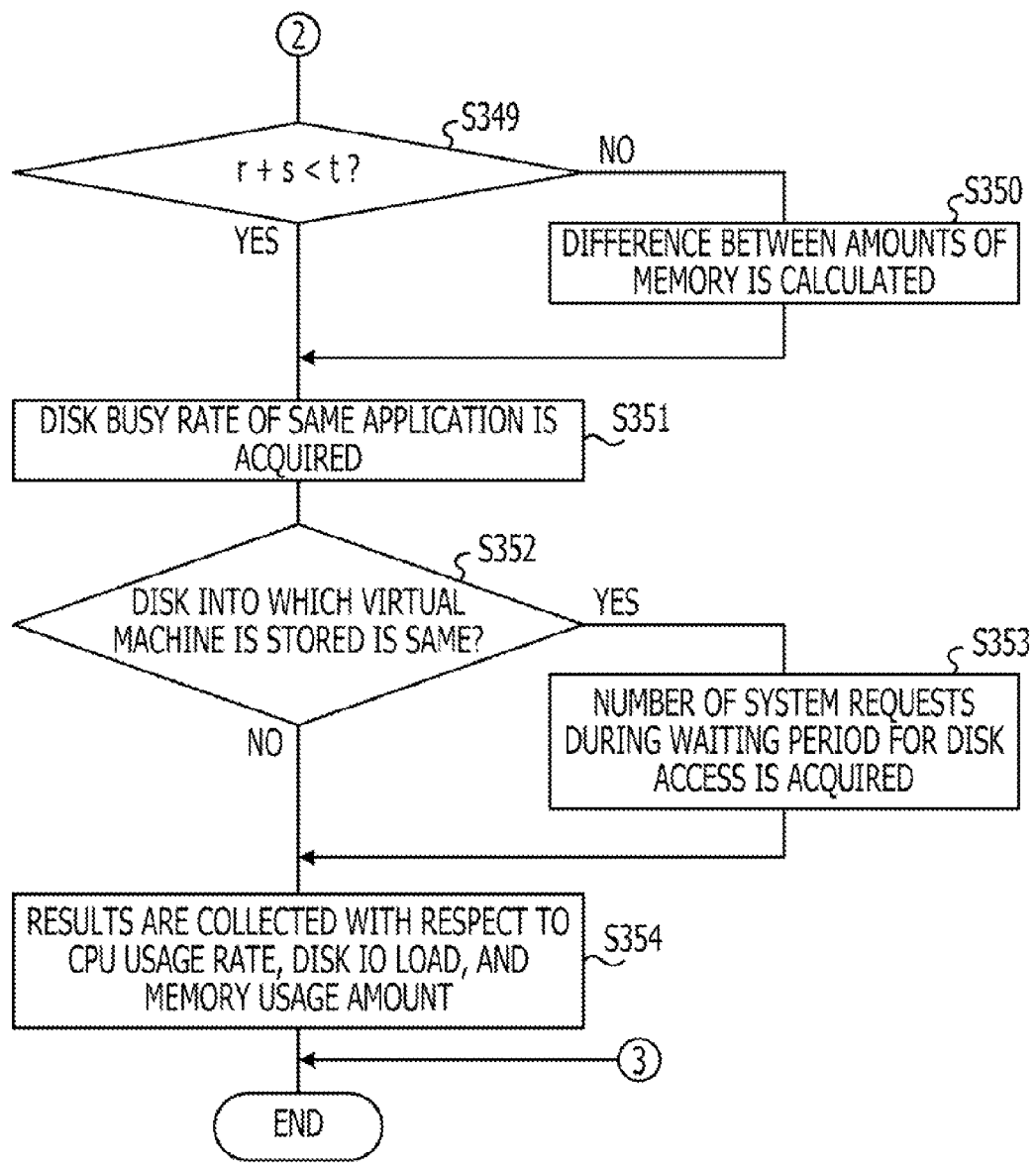
FIG. 19 illustrates a flowchart illustrating an example of a procedure for verifying an influence on another virtual machine.

FIG. 18 and FIG. 19 are flowcharts illustrating an example of a procedure for verifying an influence on another virtual machine. The verification unit 14 determines whether or not another virtual machine co-existing with the introduction target virtual machine exists (S341). When the other co-existing virtual machine does not exist (S341: NO), processing according to the present flowchart is terminated.

When it is determined that the other virtual machine co-existing with the introduction target virtual machine exists (S341: YES), the verification unit 14 calculates daily, monthly, quarterly, and yearly load peak timings in the machine (S342). In addition, the verification unit 14 determines whether or not the same peak timing as the load peak timing in the introduction destination virtual machine exists (S343). When the same peak timing does not exist (S343: NO), the processing according to the present flowchart is terminated.

When it is determined that the same peak timing exists (S343: YES), the verification unit 14 acquires the performance data of the physical machine during a time period corresponding to the peak timing (S344).

Next, the verification unit 14 compares a CPU usage rate (defined as "p") in the physical machine with a CPU usage rate (defined as "q") in the virtual machine (S345), and determines whether or not p+q<100 is satisfied (S346). When p+q is greater than or equal to 100 (S346: NO), the verification unit 14 calculates a difference between the CPU usage rates (S347).

When, in S346, it is determined that the relationship p+q<100 is satisfied (S346: YES) or when the difference between the CPU usage rates is calculated in S347 (S347), the verification unit 14 acquires the memory usage amount (defined as "r") of the physical machine, the predicted memory usage amount (defined as "s") of the virtual machine, and the amount of memory installed (defined as "t") of the physical machine (S348).

Next, the verification unit 14 determines whether or not the sum of the memory usage amount r of the physical machine and the predicted memory usage amount s of the virtual machine is less than the amount of memory installed t of the physical machine (S349). When the sum of the memory usage amount r of the physical machine and the predicted memory usage amount s of the virtual machine is greater than or equal to the amount of memory installed t of the physical machine (S349: NO), the verification unit 14 calculates a difference between the amounts of memory (S350).

When, in S349, it is determined that the sum of the memory usage amount r of the physical machine and the predicted memory usage amount s of the virtual machine is less than the amount of memory installed t of the physical machine (S349: YES) or when the difference between the amounts of memory is calculated in S350 (S350), the verification unit 14 acquires the disk busy rate of the same application (S351).

Next, the verification unit 14 determines whether or not a disk into which the virtual machine is stored is the same disk (S352), and when it is determined that the disk is the same disk (S352: YES), the verification unit 14 acquires the number of system requests during a waiting period for disk access (S353).

When, in S352, it is determined that the disk into which the virtual machine is stored is not the same disk (S352: NO) or when the number of system requests during a waiting period for disk access is acquired in S353 (S353), the verification unit 14 collects and stores the result of each of the CPU usage rate, the disk IO load, and the memory usage amount (S354), for example.

FIG. 20 is a diagram illustrating an example of a verification result. The verification result includes a performance prediction value (single performance prediction value) in a case in which an application that is an introduction target is introduced into the virtual machine, the prediction value of performance during each time period, and an influence on another application. Such a verification result is information created by the verification unit 14 every time such comparison processing as illustrated in FIG. 16 and FIG. 17 is performed or every time such verification processing as illustrated in FIG. 18 and FIG. 19 is performed, for example. The verification result may be displayed on the display unit 16.

The system provider or the administrator may determine whether or not the application is suitable for introduction, on the basis of the verification result displayed on the display unit 16. In addition, a configuration may also be adopted in which a threshold value is set for one or more items of the verification result (for example, the CPU usage rate) and the verification unit 14 compares a value obtained on the basis of the verification result with the threshold value, thereby determining whether or not the application is suitable for introduction and notifying the system provider or the administrator of the determination result.

As described above, in the present embodiment, since it is possible to preliminarily display, as a verification result, a performance issue likely to occur when the virtual machine is used, it is possible to determine whether or not the application is suitable for introduction and avoid in advance the occurrence of the performance issue. In addition, since it is possible to determine whether or not the virtual machine is an optimum virtual machine for the introduction of the application, it is possible to promote the optimization of a surplus resource.

Furthermore, since the verification apparatus 10 automatically collects the information of the physical machine and the virtual machine used for verification and performs the verification, it is possible to reduce workloads the system provider and the administrator give for release work. In addition, since it is possible to significantly reduce the work of the system provider and the administrator, it is possible to quickly provide a service with a small quantity of resources.

The present embodiment may suppress the introduction of an application into a virtual machine that does not provide assumed performance after the operation thereof is started.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A judging apparatus comprising:
    circuitry configured to
        obtain a first value which indicates a capacity of a resource assigned to a virtual machine of a plurality of virtual machines deployed in a computing environment, a first rate which indicates a rate of a resource used by the plurality of virtual machines in the computing environment, a second value which indicates a capacity of a resource of a machine that processed an application, and a second rate which indicates a rate of a resource used by the processing of the application when the machine processed the application;
        correct the second rate based on a ratio between the first value and the second value;
        predict a predicted rate of a resource to be used by the computing environment when the computing environment processes the application, based on the corrected second rate; and
        judge whether the predicted rate is over a certain value corresponding to an amount of the resource of the computing environment.

2. The judging apparatus according to claim 1, wherein the circuitry is configured to:
    search another virtual machine deployed in a second computing environment, which executes the same or a similar application as the application; and
    judges whether a sum of the first rate and a third rate which indicates a rate of a resource used by processing of the same or a similar application is over the certain value.

3. The judging apparatus according to claim 2, wherein the circuitry is configured to search, as a similar application, an application to which the amount of throughput of the another virtual machine is closely related.

4. A judging apparatus, comprising:
    circuitry configured to
        obtain a first value which indicates a capacity of a resource assigned to a virtual machine of a plurality of virtual machines deployed in a first computing environment, a first rate which indicates a rate of a resource used by the plurality of virtual machines in the first computing environment, a second value which indicates a capacity of a resource of a machine that processed an application, and a second rate which indicates a rate of a resource used by the processing of the application, wherein the first rate is obtained by measuring an amount of throughput based on the plurality of virtual machines with respect to a plurality of time periods;
        judge whether a sum of the first rate and the second rate that is corrected based on a ratio between the first value and the second value is over a certain value corresponding to an amount of the resource of the first computing environment;
        search another virtual machine deployed in a second computing environment, which executes the same or similar application as the application; and
        judge whether a sum of the third rate and the first rate based on the amount of throughput corresponding to a time period during which the amount of throughput of the another virtual machine is higher than the amount of throughput of the virtual machine is over the certain value.

5. A judging method comprising:
    obtaining, with a processor, a first value which indicates a capacity of a resource assigned to a virtual machine of a plurality of virtual machines deployed in a computing environment, a first rate which indicates a rate of a resource used by the plurality of virtual machines in the computing environment, a second value which indicates a capacity of a resource of a machine that processed an application, and a second rate which indicates a rate of a resource used by the processing of the application when the machine processed the application;
    correcting, with the processor, the second rate based on a ratio between the first value and the second value;
    predicting, with the processor, a predicted rate of a resource to be used by the computing environment when the computing environment processes the application, based on the corrected second rate; and
    judging, with the processor, whether the predicted rate is over a certain value corresponding to an amount of the resource of the computing environment.

6. A computer-readable, non-transitory recording medium storing a judging program causing a computer to execute:
    obtaining a first value which indicates a capacity of a resource assigned to a virtual machine of a plurality of virtual machines deployed in a computing environment, a first rate which indicates a rate of a resource used by the plurality of virtual machines in the computing environment, a second value which indicates a capacity of a resource of a machine that processed an application, and a second rate which indicates a rate of a resource used by the processing of the application when the machine processed the application;
    correcting the second rate based on a ratio between the first value and the second value;
    predicting a predicted rate of a resource to be used by the computing environment when the computing environment processes the application, based on the corrected second rate; and
    judging whether the predicted rate is over a certain value corresponding to an amount of the resource of the computing environment.

7. A determination apparatus comprising:
    a communication interface configured to obtain a first value which indicates a capacity of a resource assigned to a virtual machine of a plurality of virtual machines deployed in a computing environment, a first rate which indicates a rate of a resource used by the plurality of virtual machines in the computing environment, a second value which indicates a capacity of a resource of a machine that processed an application, and a second rate which indicates a rate of a resource used by the processing of the application when the machine processed the application; and a processor configured to
- correct the second rate based on a ratio between the first value and the second value;
- predicting a predicted rate of a resource to be used by the computing environment when the computing environment processes the application, based on the corrected second rate;
- judge whether the predicted rate is over a certain value corresponding to an amount of the resource of the computing environment.

* * * * *